United States Patent Office 3,075,874
Patented Jan. 29, 1963

3,075,874
MIXED ANHYDRIDES OF AROMATIC DISULFONIC ACIDS AND DIALKYLPHOSPHOROTHIOATES

William E. Weesner and James A. Webster, Dayton, Ohio, assignors to Monsanto Chemical Company, St. Louis, Mo., a corporation of Delaware No Drawing. Filed May 15, 1959, Ser. No. 813,333
13 Claims. (Cl. 167—30)

This invention relates to organic compounds of phosphorus and sulfur. In one aspect, this invention relates to a method for preparing mixed anhydrides of aromatic disulfonic acids and dialkylphosphorothioates. In another aspect, this invention relates to mixed anhydrides of aromatic disulfonic acids and dialkylphosphorothioates as new compositions. In another aspect, this invention relates to biological toxicant compositions containing mixed anhydrides of aromatic disulfonic acids and dialkylphosphorothioates as essential active ingredients. In another aspect, this invention relates to a method for controlling pests by application of a biological toxicant composition containing mixed anhydrides of aromatic disulfonic acids and dialkylphosphorothioates.

Numerous organic compounds containing both sulfur and phosphorus atoms are known and have proven to be valuable for uses such as stabilizers, synthetic lubricants, flame retardants, detergents and the like. Because of the technical importance of these compounds, it is desirable that new compounds containing sulfur and phosphorus atoms be discovered.

We have discovered that an aromatic disulfonyl halide can react with an inorganic salt of a dialkylphosphorothioate to form mixed anhydrides thereof as new compositions.

An object of this invention is to provide a method for reacting an aromatic disulfonyl halide with an inorganic salt of a dialkylphosphorothioate.

Another object of this invention is to provide mixed anhydrides of aromatic disulfonic acids and dialkylphosphorothioates as new compositions.

Another object of this invention is to provide biological toxicant compositions containing as an essential active ingredient a mixed anhydride of an aromatic disulfonic acid and a dialkylphosphorothioate obtained by reacting an aromatic disulfonyl halide with an inorganic salt of a dialkylphosphorothioate.

Another object of this invention is to provide a method for controlling pests by application to the situs of the pest of a toxic quantity of a mixed anhydride of an aromatic disulfonic acid and a dialkylphosphorothioate obtained by reacting an aromatic disulfonyl halide with an inorganic salt of a dialkylphosphorothioate.

Other aspects, objects and advantages of this invention will be apparent from a consideration of the accompanying disclosure and the appended claims.

In accordance with the present invention, an aromatic disulfonyl halide is reacted with an inorganic salt of a dialkylphosphorothioate to form a mixed anhydride of an aromatic sulfonic acid and a dialkylphosphorothioate. The reaction can be illustrated by the following equation:

wherein $R_1$ is selected from the group consisting of aryl, alkaryl, and diaryl radicals, $R_2$ is a lower alkyl radical, Y is selected from the group consisting of oxygen and sulfur, X is selected from the group consisting of chlorine, bromine, and fluorine, and M is selected from the group consisting of ammonium, sodium and potassium.

Also, according to the present invention, there are provided, as new compounds, organic phosphorus compounds of the formula wherein $R_1$, $R_2$ and Y are as above defined.

Further, according to the invention, there are provided biological toxicant compositions comprising an inert carrier adjuvant and as the essential active ingredient an organic phosphorus compound of the formula wherein $R_1$, $R_2$ and Y are as above defined.

Further, according to the invention, there is provided a method for controlling pests by the application to the situs of the pests of a toxic amount of a biological toxicant composition containing an organic phosphorus compound of the formula wherein $R_1$, $R_2$ and Y are as above defined.

The aromatic disulfonyl halide used as a reactant in the present invention can be of the aryl, alkaryl and diaryl types wherein the sulfonic acid groups are attached to the aromatic ring through benzenoid carbon atoms. The aromatic radicals may include phenyl, methylphenyl, ethylphenyl, amylphenyl, diamylphenyl, butylphenyl, naphthyl, butylnaphthyl, amylnaphthyl, biphenylyl, methylbiphenylyl, amylbiphenylyl, xylyl, and the like. Preferably, the aromatic radical of the aromatic disulfonyl halide, defined as $R_1$ in the above equation, contains less than 20 carbon atoms, and still more preferably is a phenyl radical.

The halogen substituent of the aromatic disulfonyl halide reactant used in the present invention can be either a chlorine, a bromine or a fluorine. Preferably, the aromatic disulfonyl halide is a chloride.

In the process of this invention, the aromatic disulfonyl halide must contain two sulfonyl halide substituents; that is, the aromatic monosulfonyl halides cannot be used to form mixed anhydrides of aromatic disulfonic acids and dialkylphosphorothioates. Illustrative examples of some aromatic disulfonyl halides employed in this invention include the following:

o-Benzenedisulfonyl chloride
m-Benzenedisulfonyl chloride
p-Benzenedisulfonyl chloride
o-Benzenedisulfonyl bromide
m-Benzenedisulfonyl bromide p-Benzenedisulfonyl bromide
o-Benzenedisulfonyl fluoride
m-Benzenedisulfonyl fluoride
p-Benzenedisulfonyl fluoride
2,3-toluenedisulfonyl chloride
2,4-toluenedisulfonyl chloride
2,6-toluenedisulfonyl chloride
3,4-toluenedisulfonyl chloride
3,5-toluenedisulfonyl chloride
2,3-toluenedisulfonyl fluoride
2,4-toluenedisulfonyl fluoride
3,4-toluenedisulfonyl fluoride
2,2'-biphenyldisulfonyl chloride
3,3'-biphenyldisulfonyl chloride
4,4'-biphenyldisulfonyl chloride
2,4'-biphenyldisulfonyl bromide
4,4'-biphenyldisulfonyl bromide
2,2'-biphenyldisulfonyl fluoride
3,4'-biphenyldisulfonyl fluoride
1,4-naphthylenedisulfonyl chloride
2,3-naphthylenedisulfonyl chloride
1,2-naphthylenedisulfonyl chloride
1,4-naphthylenedisulfonyl bromide
2,3-naphthylenedisulfonyl bromide
1,4-naphthylenedisulfonyl fluoride
2,3-naphthylenedisulfonyl fluoride The inorganic salt of a dialkylphosphorothioate used as a reactant in the present invention can be either an ammonium, sodium or potassium salt. The preferred inorganic salt is an ammonium dialkylphosphorothioate. The alkyl radical of the phosphorothioate is preferably a lower alkyl which is herein defined as having less than 8 carbon atoms. Ethyl is the preferred alkyl radical. The phosphorothioate can be either the mono- or the dithioate and preferably is the dithioate. Examples of dialkylphosphorothioates which can be used include:

Ammonium O,O-dimethylphosphoromonothioate
Ammonium O,O-diethylphosphoromonothioate
Ammonium O,O-dipropylphosphoromonothioate
Ammonium O,O-dibutylphosphoromonothioate
Ammonium O,O-dihexylphosphoromonothioate
Sodium O,O-dimethylphosphoromonothioate
Sodium O,O-diethylphosphoromonothioate
Sodium O,O-dipropylphosphoromonothioate
Sodium O,O-dibutylphosphoromonothioate
Potassium O,O-dimethylphosphoromonothioate
Potassium O,O-diethylphosphoromonothioate
Potassium O,O-dipropylphosphoromonothioate
Potassium O,O-dibutylphosphoromonothioate
Ammonium O,O-dimethylphosphorodithioate
Ammonium O,O-diethylphosphorodithioate
Ammonium O,O-dipropylphosphorodithioate
Ammonium O,O-dibutylphosphorodithioate
Ammonium O,O-dihexylphosphorodithioate
Sodium O,O-dimethylphosphorodithioate
Sodium O,O-diethylphosphorodithioate
Sodium O,O-dipropylphosphorodithioate
Sodium O,O-dibutylphosphorodithioate
Sodium O,O-dihexylphosphorodithioate
Potassium O,O-dimethylphosphorodithioate
Potassium O,O-diethylphosphorodithioate
Potassium O,O-dipropylphosphorodithioate
Potassium O,O-dibutylphosphorodithioate
Potassium O,O-dihexylphosphorodithioate The reaction of the present invention is dependent upon the functional groups and not upon the number of carbon atoms in the radicals represented by $R_1$ and $R_2$ in the above equation. In the preferred form of the invention, $R_1$ can include up to 20 carbon atoms and $R_2$ can include up to 8 carbon atoms; however, the invention is operable with reactants wherein $R_1$ and $R_2$ each contain more than the above specified number of carbon atoms.

Reaction between the aromatic disulfonyl halide and phosphorothioate reactants of the invention takes place merely by bringing the separate reactants together at room temperature. The reaction is slightly exothermic and the rate of reaction can be increased by raising the temperature of the reaction mass. Ordinarily, a temperature below 100° C. is used and the temperature is usually above 0° C. Preferably, the temperature is maintained in the range of from 20 to 50° C.

The reaction of this invention can be effected at increased pressure; however, the ease of reaction at ordinary atmospheric pressure obviates the need for increased pressure.

The disulfonyl halide and phosphorothioate usually react in stoichiometric proportions; however, a slight excess of the phosphorothioate can be used. The reaction also takes place with a large excess of the phosphorothioate reactant but difficulty is encountered in separating the unreacted reactant from the mixed anhydride formed.

Preferably, the reactants are brought together dissolved or suspended in suitable solvents. Polar solvents are preferred but hydrocarbons can also be used. Examples of such solvents include ether, acetone, hexane, benzene and toluene. The reactants can be dissolved in the same solvent or different solvents can be used for each reactant. It is preferred that the aromatic disulfonyl halide be substantially dissolved in the solvent and a polar solvent such as ether or acetone is ordinarily used for this purpose. The phosphorothioate need not be completely dissolved in the solvent and a portion thereof can be present as a suspension. The solvent or solvents used should have relatively low boiling points so that they can be readily separated from the reaction products. Also, the selected solvent must be one which does not chemically react with any of the reactants or the products formed.

The reaction effluent obtained from the reaction of the aromatic disulfonyl halide and the phosphorothioate reactants can be separated by any of the methods known to those skilled in the art. Depending upon the choice of solvent, the inorganic halide salt formed in the reaction will be a solid material which can be readily separated by filtration. However, if the solvent or solvents used renders the inorganic halide salt soluble in the reaction effluent, the separation of the inorganic halide salt can be effected by distillation or solvent extraction. Thus, the solvent can be removed from the reaction effluent by distillation, resulting in precipitation of the inorganic halide salt, followed by filtration to separate out the inorganic halide salt. In a solvent extraction recovery process, the reaction effluent can be contacted with water which will dissolve out the inorganic halide salt and other impurities leaving the mixed anhydride as product of the process.

The mixed anhydrides obtained as a product of the reaction of this invention are stable compounds which are usually dark colored viscous liquids. They are insoluble in water and very soluble in benzene. They have relatively high boiling points and decompose at highly elevated temperatures. These compounds are particularly useful as biological toxicants, for example, as miticides and fungicides. These compounds have also been found to have herbicidal and nematocidal activity.

The advantages, desirability and usefulness of the present invention will be illustrated by the following examples.

*Example 1*

S,S'-m-benzenedisulfonyl-bis-(O,O-diethylphosphorodithioate) was prepared by the reaction of 27.5 g. of m-benzenedisulfonyl chloride (0.1 mole) with 50.8 g. of ammonium O,O-diethylphosphorodithioate (0.25 mole) in an acetone solvent or diluent. The reaction was conducted at a temperature of 50–60° C. under reflux for a period somewhat longer than 2 hours. The reaction effluent was left standing overnight and then filtered to remove the precipitated ammonium chloride. The filtrate was warmed on a steam bath under a vacuum of 20 mm.

to evaporate the solvent. After another filtration, the resulting material was further evaporated under a vacuum of 0.5 mm. The residue recovered from this last evaporation was identified as S,S'-m-benzenedisulfonyl-bis-(O,O-diethylphosphorodithioate). The elemental analysis of this material was as follows: carbon 27.5%, hydrogen, 4.9%, sulfur 33.0%, and phosphorus 13.7%. The calculated values of S,S'-m-benzene-disulfonyl-bis-(O,O-diethylphosphorodithioate) were as follows: carbon 29.2%, hydrogen 4.2%, sulfur 33.5% and phosphorus 10.75%. The refractive index of the material was found to be 1.5667 $n_D^{25}$. The infra-red spectrum of this material was consistent with the indicated structure.

*Example 2*

The mixed anhydride prepared in Example 1 was tested in a spore germination test by the application of a 0.02 ml. portion of an acetone solution of the chemical to a depressed glass slide which was allowed to evaporate to dryness. A 0.1 ml. portion of a spore suspension containing *Monilinia fructicola* in a concentration of 40,000 per ml. was added to the slide to give a final concentration of the chemical of 100 p.p.m. The slides were then placed in Petri plates containing small amounts of distilled water and incubated from 10 to 20 hours at 25° C. The effectiveness of the chemical was ascertained by counting 100 spores in each of the wells and noting the number of germinated and ungerminated spores. In this test, it was found that less than 2 spores out of every 100 had germinated.

*Example 3*

The compound prepared in Example 1 was tested as a soil fungicide against damping-off fungi, *Rhizoctonia solani, Sclerotium rolfsii, Fusarium lycopersici, Verticillium albo-atrum,* and Pythium sp. by the application of a known amount of the chemical in solution to one pound of infested soil contained in a Mason jar. The Mason jar was sealed and incubated at room temperature for 24 hours. Thereafter, the soil was transferred to 4-inch clay pots within which 5 seeds of each of Black Valentine Beans, Delta Pine 15 Cotton, Straight Eight Cucumbers, and Laxton's Progress pea seeds had been sown. The seeded pots were then incubated at 70° F. and 98% relative humidity for 24 hours. Then the pots were removed to the greenhouse where disease assessments were made 10 to 14 days later. This compound was found to be very effective when applied at a rate of 100 p.p.m. which is equivalent to approximately 150 pounds per 6-inch acre since between 18 and 20 healthy plants were observed out of every 20 possible plants.

*Example 4*

In this example, the compound prepared in Example 1 was tested as an insecticide in an infested plant contact spray test. In this test, plants of Black Valentine Beans were infested with the 2-spotted spider mite *Tetranychus telarius* and then sprayed with either a 0.1% or a 0.025% suspension of the test chemical. The sprayed plants were held 7 days for observation of kill of mobile and resting forms, eggs, and residual effects on the population. At the end of that period, inspection of the sprayed plants showed a 100% kill of both the adults and eggs in both the mobile and resting stages and a 100% residual toxicity at the 0.1% concentration of the mixed anhydride. At a concentration of 0.025% these values were observed to be 90% kill and 90% residual toxicity. It was also observed that the mixed anhydrides of this invention exhibited no phytotoxicity to the bean plants.

The mixed anhydrides of this invention can be applied for pesticidal use in the usual manner well known to those skilled in the art. Thus, these compounds can be applied in the form of sprays, aerosols or dust. The mixed anhydrides can be dissolved in various solvents, such as acetone, or suspended in various liquid carriers such as water. Emulsions can be formed in water, including the use of the usual emulsifying agents such as long-chained polyalkylene glycols and the like. The mixed anhydrides can be applied in small concentrations, for example, in concentrations of say from 0.001% to 1.0% by weight of the total composition. When applied as dusts, the mixed anhydrides of this invention are admixed with the usual solid carriers, including talc, clay, bentonite, fuller's earth and the like.

Reasonable variation and modification are possible within the scope of the foregoing disclosure and the appended claims, the essence of which is that there have been provided a method for reacting an aromatic disulfonyl halide with an inorganic salt of a dialkylphosphorothioate to form a mixed anhydride, said resulting mixed anhydride as new compositions, biological toxicant compositions containing said mixed anhydrides as the essential active ingredient, and methods for killing pests by the application of said biological toxicant composition to the situs of the pest.

We claim:

1. S,S'-m-benzenedisulfonyl-bis-(O,O-diethylphosphorodithioate).

2. The method of reacting benzenedisulfonyl chloride with an ammonium salt of a dialkylphosphorodithioate and recovering from the resulting reaction mixture a compound of the formula 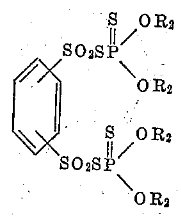 wherein $R_2$ is an alkyl radical.

3. The method of reacting benzenedisulfonyl chloride with ammonium O,O-diethylphosphorodithioate and recovering from the resulting reaction mixture S,S'-m-benzenedisulfonyl-bis-(O,O-diethylphosphorodithioate).

4. A fungicidal composition comprising an oil-in-water emulsion of a toxic quantity of S,S'-m-benzenedisulfonyl-bis-(O,O-diethylphosphorodithioate).

5. An organic compound of the formula 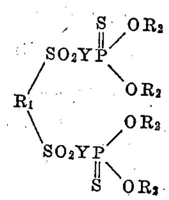 wherein $R_1$ is selected from the group consisting of phenylene, lower alkyl phenylene, di-lower alkyl phenylene, naphthylene, lower alkyl naphthylene, biphenylene, and lower alkyl biphenylene; $R_2$ is a lower alkyl radical, and Y is selected from the group consisting of oxygen and sulfur.

6. An organic phosphorus compound having the formula 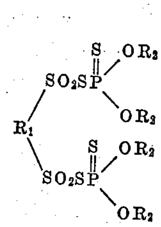 wherein $R_1$ is selected from the group consisting of phenylene, lower alkyl phenylene, di-lower alkyl phenylene, naphthylene, lower alkyl naphthylene, biphenylene, and lower alkyl biphenylene; $R_2$ is an alkyl radical of from 1 to 8 carbon atoms.

7. A method which comprises reacting an aromatic disulfonyl halide of the formula

wherein $R_1$ is selected from the group consisting of phenylene, lower alkyl phenylene, di-lower alkyl phenylene, naphthylene, lower alkyl naphthylene, biphenylene, and lower alkyl biphenylene; and X is selected from the group consisting of chlorine, bromine, and fluorine, with a phosphorothioate of the formula

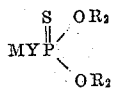

wherein M is selected from the group consisting of ammonium, sodium, and potassium; Y is selected from the group consisting of oxygen and sulfur; and $R_2$ is a lower alkyl radical, and recovering from the resulting reaction mixture the compound of the formula

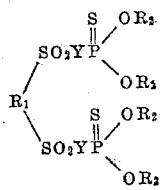

wherein $R_1$, $R_2$ and Y are as defined above.

8. The method which comprises reacting an aromatic disulfonyl halide with an ammonium salt of a dialkylphosphorothioate and recovering from the resulting reaction mixture a compound of the formula

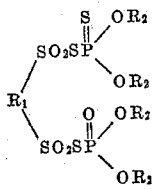

wherein $R_1$ is selected from the group consisting of phenylene, lower alkyl phenylene, di-lower alkyl phenylene, naphthylene, lower alkyl naphthylene, biphenylene, and lower alkyl biphenylene; and $R_2$ is a lower alkyl radical.

9. The method which comprises reacting an aromatic disulfonyl halide with an ammonium salt of a dialkyl phosphorothioate and recovering from the resulting reaction mixture a compound of the formula

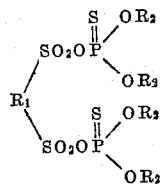

wherein $R_1$ is selected from the group consisting of phenylene, lower alkyl phenylene, di-lower alkyl phenylene, naphthylene, lower alkyl naphthylene, biphenylene, and lower alkyl biphenylene; and $R_2$ is a lower alkyl radical.

10. A biological toxicant comprising an inert carrier and as an essential active ingredient an organic compound of the formula

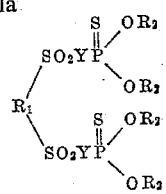

wherein $R_1$ is selected from the group consisting of phenylene, lower alkyl phenylene, di-lower alkyl phenylene, naphthylene, lower alkyl naphthylene, biphenylene, and lower alkyl biphenylene; and $R_2$ is a lower alkyl radical, and Y is selected from the group consisting of oxygen and sulfur.

11. A biological toxicant comprising an inert carrier and as an essential active ingredient an organic compound of the formula

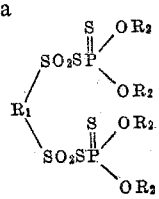

wherein $R_1$ is selected from the group consisting of phenylene, lower alkyl phenylene, di-lower alkyl phenylene, naphthylene, lower alkyl naphthylene, biphenylene, and lower alkyl biphenylene; and $R_2$ is an alkyl radical of from 1 to 8 carbon atoms.

12. A fungicidal composition comprising an oil-in-water emulsion of a toxic quantity of a compound of the formula

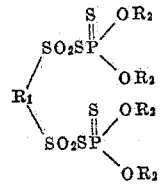

wherein $R_1$ is selected from the group consisting of phenylene, lower alkyl phenylene, di-lower alkyl phenylene, naphthylene, lower alkyl naphthylene, biphenylene, and lower alkyl biphenylene; and $R_2$ is a lower alkyl radical having less than 8 carbon atoms.

13. The method of killing pests which comprises applying to the situs of the pests a toxic quantity of a compound having the formula

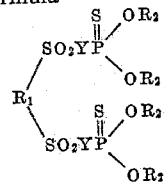

wherein $R_1$ is selected from the group consisting of phenylene, lower alkyl phenylene, di-lower alkyl phenylene, naphthylene, lower alkyl naphthylene, biphenylene, and lower alkyl biphenylene; $R_2$ is a lower alkyl radical; and Y is selected from the group consisting of oxygen and sulfur.

References Cited in the file of this patent

UNITED STATES PATENTS 2,648,696    Whetstone    Aug. 11, 1953

FOREIGN PATENTS 767,153    Germany    Jan. 31, 1952